United States Patent
Hasty

(10) Patent No.: US 11,960,489 B2
(45) Date of Patent: Apr. 16, 2024

(54) SYSTEM, METHOD AND SOFTWARE FOR DIGITIZING AND AUTOMATING THE AUDITING PROCESS

(71) Applicant: James Hasty, Alpharetta, GA (US)

(72) Inventor: James Hasty, Alpharetta, GA (US)

( * ) Notice: Subject to any disclaimer, the term of this patent is extended or adjusted under 35 U.S.C. 154(b) by 0 days.

(21) Appl. No.: 17/304,348

(22) Filed: Jun. 18, 2021

(65) Prior Publication Data
US 2022/0405286 A1    Dec. 22, 2022

(51) Int. Cl.
*G06F 16/2455*    (2019.01)
*G06F 16/23*    (2019.01)
*G06F 16/242*    (2019.01)
*G06F 16/2457*    (2019.01)
*G06F 16/25*    (2019.01)

(52) U.S. Cl.
CPC .... *G06F 16/24564* (2019.01); *G06F 16/2358* (2019.01); *G06F 16/2423* (2019.01); *G06F 16/24575* (2019.01); *G06F 16/252* (2019.01)

(58) Field of Classification Search
CPC ......... G06F 16/24564; G06F 16/24575; G06F 16/2358; G06F 16/2423; G06F 16/252; G06F 16/1873; G06F 16/1767; G06F 16/1824; G06F 16/9535; G06F 16/217; G06F 16/40; G06F 16/2282; G06F 16/3329; G06F 16/2365; G06F 16/95
See application file for complete search history.

(56) References Cited

U.S. PATENT DOCUMENTS

| | | | | |
|---|---|---|---|---|
| 10,963,796 B1* | 3/2021 | Marple | ................ | G06N 5/01 |
| 2007/0198312 A1* | 8/2007 | Bagchi | ................ | G06F 17/18 |
| | | | | 705/7.41 |
| 2009/0240606 A1* | 9/2009 | Oakman | ................ | G06Q 10/00 |
| | | | | 705/30 |
| 2021/0216498 A1* | 7/2021 | Congnan | ................ | G06F 16/221 |
| 2022/0164732 A1* | 5/2022 | Brannon | ............ | G06F 21/6245 |

OTHER PUBLICATIONS

Keskinen et al. "A Qualitative research on the impact of automation on the audit process" Department of Business Administration Master's Thesis in Business Administration III, 30 Credits, Spring 2019 (Year: 2019).*

* cited by examiner

*Primary Examiner* — Vaishali Shah
*Assistant Examiner* — Berhanu Mitiku
(74) *Attorney, Agent, or Firm* — Dunlap Bennett & Ludwig, PLLC

(57) ABSTRACT

The present invention provides a system, method and software for digitizing and automating an auditing process. The system comprises a computer, a regulations database, a storage database, and a software program. The method includes: providing regulations or standards for a user to select from the regulations database as a focus for an audit; providing a user-selected filtered regulation or standard from the regulations database; presenting the user a plurality of audit questions in the form of an audit row, one audit row at a time; receiving user responses from which at least one standard row item is created and/or updated; and sending one or more of a filtered regulation or standard row item to the storage database as an audit. The system may permit user information updates. After an audit is completed, the system may transfer the audit information into a final report, which may be provided to the user.

4 Claims, 1 Drawing Sheet

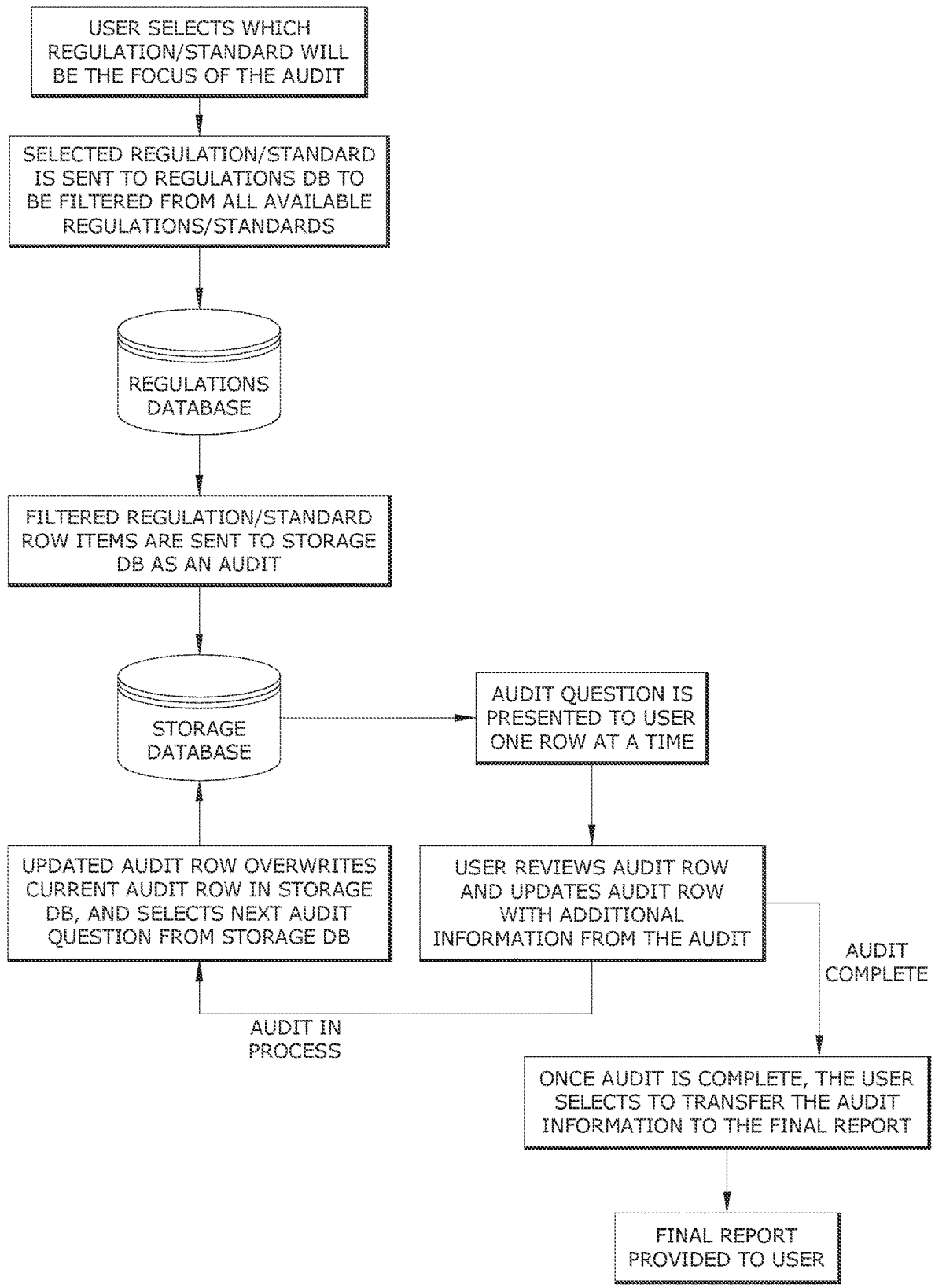

SYSTEM, METHOD AND SOFTWARE FOR DIGITIZING AND AUTOMATING THE AUDITING PROCESS

BACKGROUND OF THE INVENTION

The present invention relates to auditing systems, and more particularly, to a system, method and software for digitizing and automating the auditing process.

Currently available auditing systems force auditors to document information on a medium during an audit. Once an audit is complete, the auditor must transfer all the information collected to a final report. This process takes time and increases the possibility of incorrectly transferring information, or missing information.

Further, current systems require auditors to maintain a separately accessible set of required regulations to refer to during an audit.

A need exists for a system, method and software for digitizing and automating the auditing process. A further need exists for such a system to provide convenient access to a current reference copy of pertinent regulations.

SUMMARY OF THE INVENTION

Advantageously, in one aspect, the present invention provides a solution to these problems. The present invention provides a system, method and software for digitizing and automating the auditing process.

The system of the present invention is capable of automating the documentation of information during an audit. Once the audit is complete, the auditor does not have to transfer the information to a final report, because the system is capable of providing this step automatically. The system of the present invention saves time and may eliminate the possibility of incorrectly transferring information or missing information.

These and other features, aspects and advantages of the present invention will become better understood with reference to the following drawing, description and claims.

BRIEF DESCRIPTION OF THE DRAWING

The preferred embodiment of the claimed subject matter will hereinafter be described in conjunction with the appended drawing provided to illustrate and not to limit the scope of the claimed subject matter, in which:

The Sole FIGURE is a flow chart of an exemplary embodiment of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

As used herein, "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in the sole FIGURE. Furthermore, as there is no intention to be bound by any express or implied theory presented in the preceding technical field, background, brief summary or the following detailed description, it is also to be understood that the specific devices and processes illustrated in the attached drawing, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Broadly, the present invention provides a system, method and software for digitizing and automating the auditing process.

The system may include at least one computer with a user interface. The computer may include at least one processing unit coupled to a form of memory. The computer may include, but may not be limited to, a microprocessor, a server, a desktop, laptop, and smart device, such as, a tablet and smart phone. The computer may include a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer and/or smart device may access the software via the web browser using the internet, extranet, intranet, host server, internet cloud and the like.

The ordered combination of various ad hoc and automated tasks in the presently disclosed platform necessarily achieve technological improvements through the specific processes described more in detail below. In addition, the unconventional and unique aspects of these specific automation processes represent a sharp contrast to merely providing a well-known or routine environment for performing a manual or mental task.

The present invention provides an unprecedented solution to the problems associated with current auditing processes. Current auditing processes force auditors to document information on a medium during an audit. Once the audit is complete, the auditor has to transfer all the information to a final report. This is disadvantageous as it is time consuming, and further increases the possibility that information may be incorrectly transferred or may become lost.

The system, method and software of the present invention is capable of use to enable auditors to automatically document information during an audit. Once the audit is complete the auditor no longer needs to transfer all the information to a final report, as the system and software is capable of automatically documenting and storing the information. The system of the present invention may therefore save time and reduce errors through incorrect or lost information.

The system of the present invention distinguishes over and differs from previous solutions. The system of the present invention may be beneficially used by an auditor to directly document the audit information into the system. Then, the system automatically transfers the information into a final report. An added beneficial feature is that the system provides a reference copy of current required regulation(s), in a manner accessible and visible to the auditor during the audit.

The system of the present invention further provides an advancement over previous manual auditing processes. The system software is capable of converting the previous manual process to a digital process. The system, software and method of the present invention are truly the first of their kind.

Referring to the sole FIGURE, a flow chart of an exemplary embodiment of the present invention is provided.

The system and software may operate in a process including one or more of the following steps and combinations thereof. In addition, the present invention may comprise a user method including one or more of these steps and combinations thereof.

First, a user may select one or more regulations or standards to be the focus of the audit. The selected regulations or standards may be sent to the regulations database, to be filtered from all available regulations and standards. After the selected regulations are sent to the regulations database, the filtered regulation or standard row items are sent to the storage database as an audit.

Audit questions may be presented to a user one row at a time.

A user may review an audit row and update the audit row with additional information from the audit.

As the in-process audit continues, the updated audit row overwrites the current audit row in the storage database, and selects a next audit question from the storage database. The process will continue until there no questions remain.

Once the audit is complete, the user may select to transfer the audit information into a final report.

The final report may then be provided to the user in any suitable format, such as electronic, digital or on paper.

In some embodiments the process may include one or more of the following steps and combinations thereof.
1. User selects Audit type.
2. Based on the User Selection the software presents the information to the User one item at a time.
3. User reads the information and documents a response based on the information provided during an audit.
4. Once all items have been completed, user prints out a complete report based on the information provided by User.

In an exemplary embodiment the system, method and software may work in the following manner. The frontend may be used to present information to User and receive a response from the User. The Backend contains the Logic which records the information provided by the User.

To make this invention, one must build the software that is able to complete the requisite tasks and provide the user with the useful tool described above. There are multiple APIs required to make the software function correctly, these APIs are contained within the backend of the Software.

All elements of the frontend and backend are required. The backend has been automated but Machine Learning can be included to further automate the backend.

As described hereinabove, the system of the present invention may be used to perform audits and/or review regulated processes/products. The system may have applicability to a wide range of industries, and may be used for any Industry, any products, and any processes by updating the database that contains the requirements.

In summary, the present invention provides a system, method and software for digitizing and automating an auditing process. The system may comprise a computer having a user interface; a regulations database; a storage database; and a program product comprising machine-readable program code for causing, when executed, the computer to perform a system method comprising one or more of the following process steps and combinations thereof:

Providing the user a plurality of regulations or standards from the regulations database to choose as a focus for an audit and prompting the user to select at least one regulation or standard as a focus for the audit;

receiving from the user at least one selected regulation or standard as a focus for the audit;

Sending the at least one selected regulation or standard to the regulations database; filtering by the regulations database of the at least one selected regulation or standard, from all available regulations and standards in the database, so that the at least one selected regulation or standard becomes at least one filtered regulation; presenting the user a plurality of audit questions in the form of an audit row, one audit row at a time and prompting the user to provide a plurality of responses to the plurality of audit questions;

Receiving the plurality of responses to the plurality of audit questions, and creating at least one standard row item; and Sending one or more of the at least one filtered regulation, at least one standard row item, or a combination thereof, to the storage database as an audit.

In some embodiments, receiving the plurality of responses to the plurality of audit questions, and creating at least one standard row item further comprises automatically overwriting and updating of an audit row after receiving a response from the user to an audit question, and creating the at least one standard row item from an updated audit row.

In some embodiments, presenting the user a plurality of audit questions in the form of an audit row, one audit row at a time and prompting the user to provide a plurality of responses to the plurality of audit questions, further comprises presenting the user a first audit question in the form of an audit row and prompting the user to provide a first response to the first audit question.

In some embodiments, receiving the plurality of responses to the plurality of audit questions, and creating at least one standard row item further comprises receiving the first response to the first audit question from the user, automatic overwriting and updating of the audit row, and creation of a first standard row item.

In some embodiments, sending one or more of the at least one filtered regulation, at least one standard row item, or a combination thereof, to the storage database as an audit comprises sending a first standard row item to the storage database.

In some embodiments, after sending the first standard row item to the storage database, the system method may further comprise:

Presenting the user at least one additional audit question from the storage database; prompting the user to provide at least one additional response to the at least one additional audit question;

Receiving the at least one additional response to the at least one additional audit question from the user, automatic overwriting and updating of the audit row, and creation of at least one additional standard row item; and Sending the at least one additional standard row item to the storage database; and repeating the process for the plurality of audit questions until no questions remain.

In some embodiments, the system method may further comprise the user accessing a record from the storage database, the record comprising at least one of an audit, an audit row or a standard row item, and updating the record with additional information pertaining to the audit.

In some embodiments, the system method may further comprise, after an audit is completed, the user selecting a record from the storage database to transfer the audit information into a final report, and the system providing to the user the final report. The final report may be provided in any suitable format, such as, for example without limitation, a format selected from electronic, digital, paper, and combinations thereof.

The computer-based data processing system and method described above is for purposes of example only, and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications, variations and changes in detail may be made without departing from the spirit and scope of the invention as set forth in the following claims.

What is claimed is:

1. A system for automating quality assurance auditing processes and reducing data error rates, the system comprising:
   a computer having at least one processor, at least one memory, and a user interface;
   a regulations database having regulations and standards, each regulation comprising audit row items, and each standard comprising audit row items;
   a storage database having a plurality of audits, audits generated based on user provided responses, each audit comprising regulation row items, standard row items, or both, that correspond to a subset of the regulations, the standards, or both; and
   a program product, stored in the at least one memory, comprising machine-readable program code for causing, when executed, the computer to perform a system method comprising the following process steps:
   providing a user a plurality of regulations or standards from the regulations database to choose as a focus for an audit and prompting the user to select at least one regulation or standard as a focus for the audit;
   receiving from the user at least one selected regulation or standard as a focus for the audit;
   sending the at least one selected regulation or standard to the regulations database;
   filtering by the regulations database of the at least one selected regulation or standard, from all available regulations and standards in the database, so that the at least one selected regulation or standard becomes at least one filtered regulation or standard;
   converting the at least one filtered regulation or standard into an audit comprising a plurality of audit rows;
   presenting the user a first audit question corresponding to a first audit row;
   receiving the response to the audit question, and creating at least one standard row item;
   updating the first audit row after receiving the response from the user to an audit question by automatically overwriting the first audit row in the storage database with the at least one standard row item; and
   selecting a next audit question corresponding to a next audit row from the storage database for presentation to the user;
   repeating in an iterative fashion or recursive manner until no audit questions remain, wherein the audit questions are presented sequentially to the user one row at a time; and
   sending one or more of the at least one filtered regulation or standard, the plurality of audit rows, or a combination thereof, to the storage database as a completed audit.

2. The system of claim 1 wherein the system method further comprises the user accessing a record from the storage database, the record comprising at least one of the plurality of audit rows, and updating the record with additional information pertaining the audit.

3. The system of claim 2 wherein the system method further comprises, after the audit is completed, the user selecting the record from the storage database to transfer information stored in the record into a final report, and the system providing to the user the final report.

4. The system of claim 3 wherein the final report is in a format selected from electronic, digital, paper, and combination thereof.

* * * * *